(No Model.) 2 Sheets—Sheet 1.

C. F. STEINMETZ.
MACHINE FOR CUTTING THREADS ON BOLTS.

No. 283,680. Patented Aug. 21, 1883.

WITNESSES:
A. Schehl.
Otto Risch.

INVENTOR
Caspar F. Steinmetz
BY Paul Goepel
ATTORNEY (No Model.) 2 Sheets—Sheet 2.

C. F. STEINMETZ.
MACHINE FOR CUTTING THREADS ON BOLTS.

No. 283,680. Patented Aug. 21, 1883.

WITNESSES:
A. Schehl
Otto Risch

INVENTOR
Caspar Fr. Steinmetz
BY Paul Goepel
ATTORNEY

N. PETERS, Photo-Lithographer, Washington, D. C.

UNITED STATES PATENT OFFICE.

CASPAR FR. STEINMETZ, OF PORT CHESTER, NEW YORK.

MACHINE FOR CUTTING THREADS ON BOLTS.

SPECIFICATION forming part of Letters Patent No. 283,680, dated August 21, 1883.

Application filed March 24, 1883. (No model.)

*To all whom it may concern:*

Be it known that I, CASPAR F. STEINMETZ, of Port Chester, in the county of Westchester and State of New York, have invented certain new and useful Improvements in Machines for Cutting Threads on Bolts, of which the following is a specification.

This invention has reference to an improved machine for cutting screw-threads on bolts of different sizes, by which the required length of thread to be cut on the bolts is automatically determined, and then the bolt released from the cutting-chuck, so as to be removed; and the invention consists of a hollow revolving shaft having an interior spring-actuated spindle that is adjustable in longitudinal direction by suitable mechanism, the hollow shaft carrying at its outer end the thread-cutting chuck. A slide-rod and chuck hold the bolt to be cut, which is drawn in by the screw-cutting chuck. A sliding and spring-actuated guide-rod is connected by a transverse fork, with a collar at the rear end of the spindle, so as to withdraw the same from the screw-cutting chuck when a fulcrumed and spring-pressed dog is engaged by a push-rod, so as to release the notched slide-rod, the spring of which overcomes the tension of the spring of the spindle.

Figure 1:
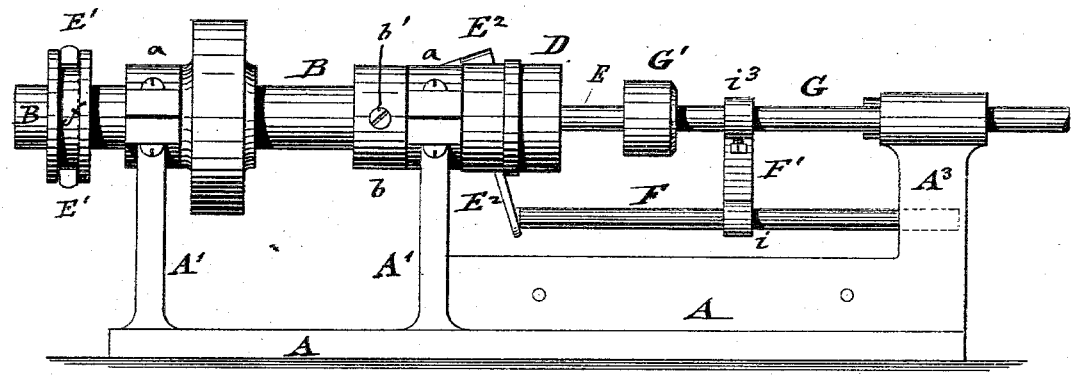
Figure 2:
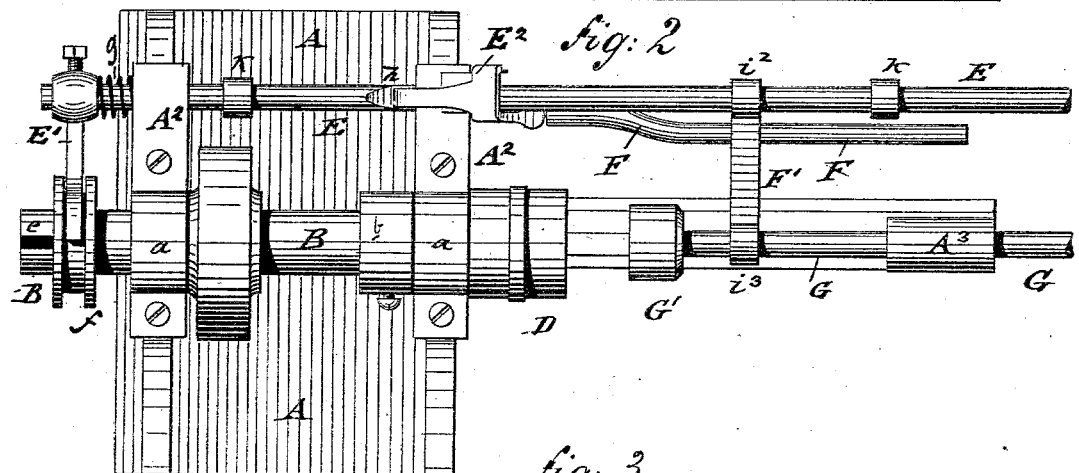
Figure 3:
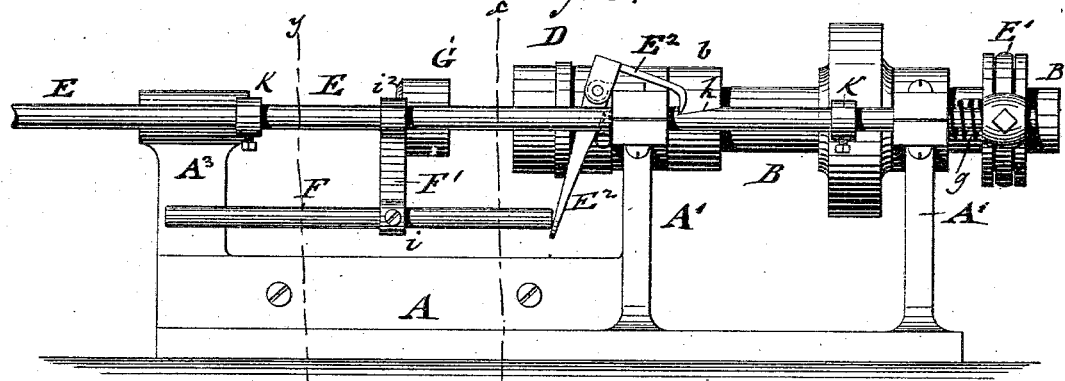
Figure 4:
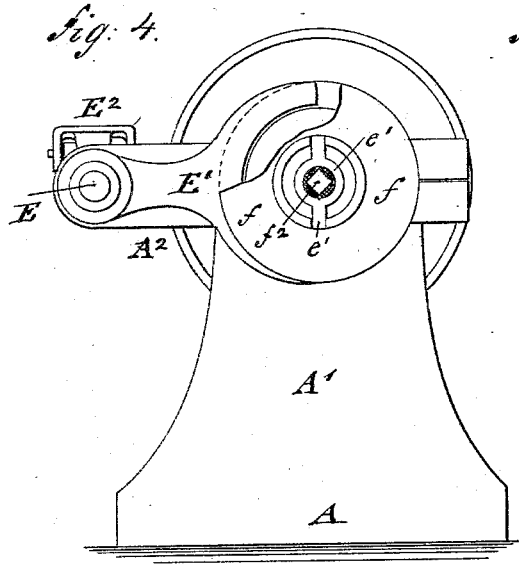
Figure 5:
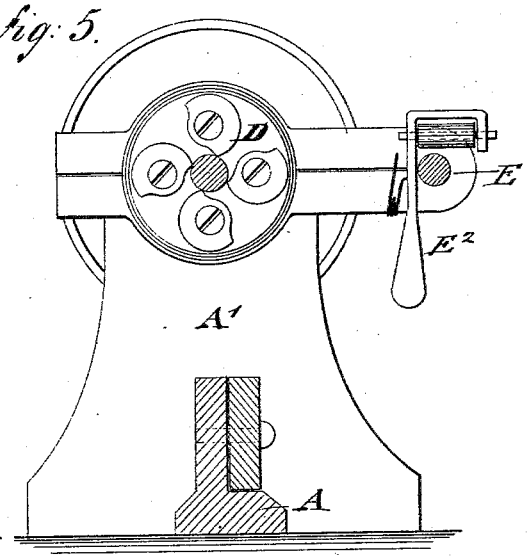
Figure 6:
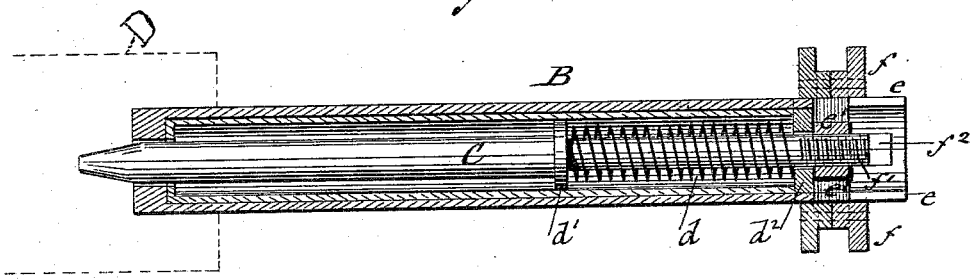
Figure 7:
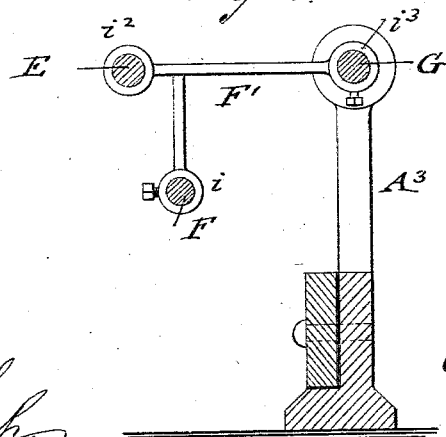

In the accompanying drawings, Figure 1 represents a front elevation of my improved machine for cutting screw-threads on bolts. Fig. 2 is a plan; Fig. 3, a rear elevation of the same. Fig. 4 is an end view of the same; Fig. 5, a vertical transverse section on line $x\ x$, Fig. 3; Fig. 6, a detail vertical longitudinal section of the hollow shaft and its spring-actuated spindle; and Fig. 7 is a vertical transverse section of the machine on line $y\ y$, Fig. 3.

Similar letters of reference indicate corresponding parts.

A in the drawings represents the bed-plates of my improved machine for cutting screw-threads on bolts.

A' A' are upright standards, which carry in suitable bearings, $a$, the hollow shaft B, that receives revolving motion by a belt-and-pulley transmission from a driving-shaft overhead. The transmitting-pulley on the shaft is keyed thereto, adjoining one of the standards A', and a collar, $b$, is attached by means of a clamp-screw, $b'$, close to the other standard A', so as to prevent the shifting of the shaft in a longitudinal direction to its bearings. A sliding spindle, C, within the hollow shaft B, serves to adjust the segmental dies of a screw-cutting chuck, D, into proper position for the size of the bolt to be threaded, and to hold said dies in contact with the bolt during the operation, as will now be explained. The inner end of this spindle is tapered or conical, and is adapted to project into the chuck through the inner end of the shaft B, to which said chuck is attached. A detailed description of the chuck is omitted in this connection, as said chuck forms the subject of separate Letters Patent applied for herewith. Suffice it to say that the dies of the chuck are set toward the axis of the bolt, more or less, according to the depth to which the conical end of the spindle is projected into the chuck. When the spindle is withdrawn, the dies are swung out of contact with the bolt by the action of springs. The movement of the spindle is controlled as follows: An expansive spiral spring, $d$, surrounding the spindle between a collar, $d'$, thereon, and an interior shoulder, $d^2$, near the outer end of the hollow shaft B, tends to thrust forward the spindle, so that its conical end enters the chuck. The rear end of the shaft B is provided with short longitudinal slots $e$ at diametrically-opposite points, which guide the radial arms of a cross-piece, $e'$, that is secured at its outer ends to a grooved exterior collar, $f$, which slides freely on the rear end of the shaft B, and is made of two symmetrical sections, connected by bolts, as shown in Fig. 6. This grooved collar $f$ is secured to the spindle C, the threaded rear end of said spindle passing through the interiorly-threaded socket-hole of the cross-piece $e'$. The extreme rear end of said spindle is provided with a square head, $f^2$, whereby, by means of a wrench, the spindle is adjusted in the cross-piece, so that the tapered front end of the spindle will project more or less under the action of the spring $d$, according to the size of the bolt to be threaded.

The upright standards A' are provided with rearwardly-extending bracket-arms A², which guide, in suitable sleeves, a slide-rod, E, that is arranged parallel to the shaft B, back of the same. The rear end of the slide-rod is connected by a transverse forked piece, E', with the grooved collar f of the spindle C. A spiral spring, g, of greater strength than the interior spiral spring, d, that actuates the spindle C, is interposed between the fork E' and the rear arm, A², and serves to overcome the tension of the spiral spring d whenever a spring-acted dog, E², that is fulcrumed to the inner bracket-arm, A², is released from a notch, h, of the slide-rod E. The dog E² is thrown out of engagement with the slide-rod E by means of a horizontal push-rod, F, which engages the downwardly-extending arm of the fulcrumed dog E². The push-rod F is supported in a guide-sleeve, i, at the lower end of an angular arm, F', the horizontal upper part of which is guided by a sleeve, $i^2$, on the slide-rod E, and secured by a sleeve and set-screw, $i^3$, to the feed-rod G, that is supported in line with the axis of the spindle C in bearings of an upright standard, A³. The slide-rod E is provided with adjustable stops k k—one near the outermost bracket-arm, A², and the other near the angular connecting-arm F'—the former serving to stop the motion of the slide-rod E, and thereby the spindle C, on the release of the dog E²; the other to carry the slide-rod E back, by means of the angular connecting-arm F', until the dog E² can re-engage the notch of the slide-rod E. The bolt to be threaded is held by clamping-jaws of a chuck, G', at the end of the feed-rod G, which latter is moved forward by the cutting action of the threading-chuck D at the end of the hollow shaft B. The chuck D gradually draws in the bolt until the proper length is cut, which is determined by the contact of the push-rod F with the lower end of the fulcrumed dog E². This contact releases the dog from the slide-rod E, so that the spring of the same throws the spindle back, the effect of which is to clear the bolt from the threading-dies of the chuck, so that the bolt can be drawn out of the cutting-chuck D and moved back with the feed-rod G from the chuck G', off which it is then removed. The backward motion of the feed-rod G carries, by means of the angular connecting-arm F' and collar k, the slide rod E back until the notch h of the same is engaged by the dog E², in which position the chuck of the feed-rod is ready to receive the next bolt. When the bolt has been inserted it is fed to the cutting-chuck D and into the same as the cutting of the same proceeds. When the push-rod F strikes the dog E², the slide-rod E is released, the spindle C drawn back by the action of spring g, and thereby the dies of the cutting-chuck D released from the bolt. The feed-rod G, which carries the chuck which holds the bolt, is then pushed back by the operator and the bolt removed from said chuck. The length of the thread to be cut on the bolt is regulated by adjusting push-rod F in the guide-sleeve i of arm F', which is accomplished by a set-screw of the sleeve i. In this manner screw-threads of any desired length may be cut on bolts of different thickness, the length of the thread being controlled by the greater or less length of the push-rod, while the cutting-chuck D is adjusted to the different thicknesses of the bolts by the adjusting mechanism at the rear-end of the revolving shaft, by which the spindle is longitudinally adjusted within the same.

Having thus described my invention, I claim as new and desire to secure by Letters Patent—

1. The combination, substantially as set forth, of a hollow rotary shaft, a screw-cutting chuck attached thereto, a spring-actuated spindle within said shaft, provided with a tapered end adapted to project into the chuck for setting the dies, and means for adjusting said tapered spindle.

2. The combination, substantially as set forth, of a hollow rotating shaft having a screw-cutting chuck at one end, a sliding spring-actuated spindle within said shaft, having a conical end which projects into said chuck, means for adjusting the spindle longitudinally within the shaft, a longitudinal spring-actuated slide-rod, and means for connecting said slide-rod with said spindle.

3. The combination of a pivoted spring-pressed dog, the front end of which is adapted to engage a notch of the slide-rod, a push-rod for releasing the dog from the slide-rod, a feed-rod provided with means for holding the bolt to be cut, and means for connecting said push-rod and feed-rod, substantially as described.

4. The combination of a hollow revolving-shaft having a screw-cutting chuck at one end and a guide-slot at the opposite end, an interior spring-actuated spindle, a cross-piece having a grooved collar applied to the rear end of the spindle, a transverse connecting-fork engaging the grooved collar, a longitudinal spring-actuated slide-rod, a fulcrumed and spring-acted dog engaging a notch of the slide-rod, a push-rod engaging the dog, and a feed-rod and clutch arranged in line with the cutter-spindle and connected to the push-rod, substantially as specified.

5. The combination, substantially as set forth, of a hollow rotary shaft, B, provided with an interior collar or stop, d', a screw-cutting chuck at one end thereof, a sliding spindle C within said shaft, tapered at the end toward the chuck, and provided with a collar, $d^2$, an expansive spring between said collars, and means for regulating the thrust of the spindle under the action of the spring, the tapered end of said spindle being adapted to enter the chuck for adjusting the dies to suit the bolt to be threaded.

6. The combination of a hollow rotary shaft, B, adapted to receive a screw-cutting chuck at one end, provided with an interior collar, $d^2$, and longitudinal slots e, a sliding spindle, C, within said shaft, tapered at one end, screw-threaded and squared at the other end, and provided with a central collar, d', an expansive spring, $d$, between said collars, a cross-piece, $e'$, having a central socket-hole, through which the threaded end of the sliding spindle passes, and a sliding collar on the shaft, to which said cross-piece is connected, substantially as described.

In testimony that I claim the foregoing as my invention I have signed my name in presence of two subscribing witnesses.

CASPAR FR. STEINMETZ.

Witnesses:
CARL KARP,
SIDNEY MANN.